US012324785B1

(12) United States Patent
Song

(10) Patent No.: US 12,324,785 B1
(45) Date of Patent: Jun. 10, 2025

(54) MASSAGE TOOL WITH PATTING STRUCTURE

(71) Applicant: Nianhua Song, Hengyang (CN)

(72) Inventor: Nianhua Song, Hengyang (CN)

( * ) Notice: Subject to any disclaimer, the term of this patent is extended or adjusted under 35 U.S.C. 154(b) by 0 days.

(21) Appl. No.: 18/822,931

(22) Filed: Sep. 3, 2024

(30) Foreign Application Priority Data

Aug. 22, 2024 (CN) ......................... 202411165333.X

(51) Int. Cl.

*A61H 23/00* (2006.01)
*A61H 15/00* (2006.01)
*A61H 19/00* (2006.01)
*A61H 23/02* (2006.01)
*A61H 39/04* (2006.01)

(52) U.S. Cl.

CPC ....... *A61H 23/006* (2013.01); *A61H 15/0085* (2013.01); *A61H 19/34* (2013.01); *A61H 23/0254* (2013.01); *A61H 39/04* (2013.01); *A61H 2015/0042* (2013.01); *A61H 2201/1215* (2013.01); *A61H 2201/1664* (2013.01); *A61H 2201/1673* (2013.01); *A61H 2201/1676* (2013.01)

(58) Field of Classification Search

CPC .. A61H 23/006; A61H 15/0085; A61H 19/34; A61H 23/0254; A61H 39/04; A61H 2015/0042; A61H 2201/1215; A61H 2201/1664; A61H 2201/1673; A61H 19/40; A61H 19/44; A61H 2201/1676

See application file for complete search history.

(56) References Cited

U.S. PATENT DOCUMENTS

| | | | | |
|---|---|---|---|---|
| 5,085,207 A * | 2/1992 | Fiore | A61H 23/0254 601/134 |
| 11,259,987 B1 * | 3/2022 | Chen | A61H 19/34 |
| 11,369,545 B1 * | 6/2022 | He | A61H 7/005 |
| 11,491,078 B1 * | 11/2022 | He | A61H 7/005 |

(Continued)

FOREIGN PATENT DOCUMENTS

| | | |
|---|---|---|
| CN | 102949286 A | 3/2013 |
| CN | 207804600 U | 9/2018 |

(Continued)

OTHER PUBLICATIONS

English translation for CN 112914982, machine translated by Espacenet.com, translated on Dec. 18, 2024.*

(Continued)

*Primary Examiner* — Tu A Vo
(74) *Attorney, Agent, or Firm* — George D. Morgan

(57) ABSTRACT

A massage tool with a patting structure includes a main body and a patting assembly. The main body is provided with a massage groove. The patting assembly is disposed in the massage groove; and one end of the patting assembly is connected to one side surface of the massage groove, and the other end of the patting assembly is connected to the other side surface of the massage groove. The patting assembly is movably disposed in the massage groove and configured to pat and massage the skin. By being movably disposed in the massage groove, the patting assembly massages a specific organ acupoint of a user, resolving the problem that a massage tool cannot massage an acupoint around a vaginal organ in multiple manners.

7 Claims, 11 Drawing Sheets

(56) References Cited

U.S. PATENT DOCUMENTS

| | | | | | |
|---|---|---|---|---|---|
| 11,633,327 | B1 * | 4/2023 | Wu | A61H 23/0263 | 601/70 |
| 11,771,619 | B1 * | 10/2023 | Yan | A61H 23/0254 | 600/38 |
| 11,998,500 | B1 * | 6/2024 | Zhang | A61H 15/0078 | |
| 12,036,176 | B1 * | 7/2024 | Wang | A61H 23/0263 | |
| 12,064,386 | B1 * | 8/2024 | Yan | A61H 23/02 | |
| 12,127,993 | B1 * | 10/2024 | Peng | A61H 23/0263 | |
| 2006/0047181 | A1 * | 3/2006 | Hsu | A61H 21/00 | 600/38 |
| 2014/0309565 | A1 * | 10/2014 | Allen | A61H 19/44 | 601/46 |
| 2015/0148592 | A1 * | 5/2015 | Kanbar | A61H 19/34 | 600/38 |
| 2020/0046598 | A1 * | 2/2020 | Shen | A61H 1/00 | |
| 2022/0071839 | A1 * | 3/2022 | Huang | A61H 23/02 | |
| 2022/0257459 | A1 * | 8/2022 | Dickinson | A61H 23/0263 | |
| 2024/0108538 | A1 * | 4/2024 | Chen | A61H 23/0254 | |
| 2024/0238155 | A1 * | 7/2024 | Huang | A61H 23/0254 | |
| 2024/0299239 | A1 * | 9/2024 | Yan | A61H 19/30 | |
| 2024/0398660 | A1 * | 12/2024 | Lin | A61H 19/34 | |

FOREIGN PATENT DOCUMENTS

| | | | | | |
|---|---|---|---|---|---|
| CN | 112914982 | A | * | 6/2021 | |
| CN | 220237320 | U | | 12/2023 | |
| CN | 118356337 | A | * | 7/2024 | |
| DE | 202024100299 | U1 | * | 4/2024 | |
| DE | 202024100783 | U1 | * | 4/2024 | A61H 23/006 |
| DE | 202024102402 | U1 | * | 6/2024 | |
| DE | 202024102702-0720241 | | * | 7/2024 | |
| DE | 202024103021 | U1 | * | 8/2024 | |
| DE | 202024103222 | U1 | * | 8/2024 | |

OTHER PUBLICATIONS

English translation for DE 20 2024 103 222, machine translated by Espacenet.com, translated on Dec. 19, 2024.*

English translation for DE 20 2024 100 299, machine translated by Espacenet.com, translated on Dec. 20, 2024.*

English translation for DE 20 2024 102 402, machine translated by Espacenet.com, translated on Dec. 21, 2024.*

* cited by examiner

MASSAGE TOOL WITH PATTING STRUCTURE

CROSS-REFERENCE TO RELATED APPLICATIONS

The application claims priority to Chinese patent application No. 202411165333.X, filed on Aug. 22, 2024, the entire contents of which are incorporated herein by reference.

TECHNICAL FIELD

The present invention relates to the technical field of massage tools, particularly to a massage tool with a patting structure.

BACKGROUND

As people's pursuit of a healthy, comfortable life deepens, the adult massage tool market has gradually thrived. These tools aim to provide the user with safe, effective, body-relaxing, and soothing services, helping to relieve stress and promote blood circulation. However, current products on the market mainly focus on specific body areas, such as the back and legs, and specially designed products are lacking to meet the particular massage needs for some sensitive areas, such as the acupoints around the vaginal organ.

In some cases, the user hopes to stimulate the acupoint around the vaginal organ through various massage methods at a specific frequency to alleviate physiological discomfort or promote local blood circulation. This demand arises from the personal health condition, the comfort preference, or the expectation for massage at a specific acupoint.

Therefore, it is necessary to provide a massage tool with a patting structure to address the above deficiency.

SUMMARY

To resolve the technical problem, the present invention provides a massage tool with a patting structure.

The technical solution of the present invention is as follows:

A massage tool with a patting structure is provided, including:

- a main body, where the main body is provided with a massage groove; and
- a patting assembly disposed in the massage groove, where one end of the patting assembly is connected to one side surface of the massage groove, the other end of the patting assembly is connected to the other side surface of the massage groove, and the patting assembly is movably disposed in the massage groove and configured to pat and massage the skin.

In an achievable implementation, the patting assembly includes a patting sleeve tube and a patting member, one end of the patting member is connected to one end of the patting sleeve tube, the other end of the patting sleeve tube is connected to one side surface of the massage groove, and the patting sleeve tube is configured to drive the patting member to pat and massage the skin.

In an achievable implementation, the patting assembly further includes a constraining section, the constraining section has one end connected to the other end of the patting member and the other end connected to the other side surface of the massage groove, and the constraining section is configured to constrain motion amplitude of the patting member.

In an achievable implementation, the patting member includes a patting rubber sleeve, the patting rubber sleeve is provided with a cavity, a patting base is formed at a bottom of the cavity of the patting rubber sleeve, a patting platform is disposed on the patting base, and a patting ball for pat and massage is disposed on the patting platform.

In an achievable implementation, the massage tool further includes a first transmission assembly configured to drive the patting rubber sleeve to move vertically along the massage groove. The first transmission assembly includes a driving motor, a transmission member, and a swinging rod. The transmission member has one end connected to the driving motor and the other end connected to the swinging rod, and the transmission member is configured to enable the swinging rod to drive the patting rubber sleeve to move in the massage groove.

In an achievable implementation, the transmission member includes a centrifugal shaft and a transmission support connected to the centrifugal shaft. The centrifugal shaft has one end connected to the driving motor and the other end connected to one end of the transmission support. The other end of the transmission support is connected to the swinging rod, and the centrifugal shaft is configured to drive the transmission support to perform offset motion, so as to drive the swinging rod to move.

In an achievable implementation, the transmission support includes a first movable rod, a second movable rod, and a transmission shaft movably sleeving the first movable rod. The transmission shaft is connected to the other end of the centrifugal shaft, the first movable rod and the second movable rod are both movably connected to the swinging rod, and the transmission shaft is configured to repeatedly change a bending amplitude of the first movable rod, so as to shake the swinging rod.

In an achievable implementation, the main body is provided with a stirring portion, the stirring portion extends to form a stirring sleeve, and the stirring sleeve is located above the massage groove.

A second transmission assembly in the stirring sleeve is also included, and the second transmission assembly is configured to drive the stirring sleeve to stir for massage.

In an achievable implementation, the main body extends upwards to form a vibrating end head, a vibrating assembly is disposed in the vibrating end head, and the vibrating assembly is configured to drive the vibrating end head to vibrate to massage a user.

In an achievable implementation, the vibrating assembly includes a vibrating sleeve tube and a vibrating member in the vibrating sleeve tube, and the vibrating member is configured to drive the vibrating sleeve tube and the vibrating end head to vibrate.

According to the foregoing solution, the present invention has beneficial effects: A massage tool with a patting structure is provided, including a main body and a patting assembly. The main body is provided with a massage groove, allowing the patting assembly to reciprocate in a direction between the upper and lower end surfaces of the main body, thereby patting and massaging the acupoints around the vaginal organ of the user. As compared with the conventional massage tools, pat and massage functions are increased for the vaginal acupoints, resolving the problem that a massage tool cannot massage a vaginal acupoint in multiple manners. Therefore, the present invention can enhance the functional diversity of massage tools.

Figure 1:
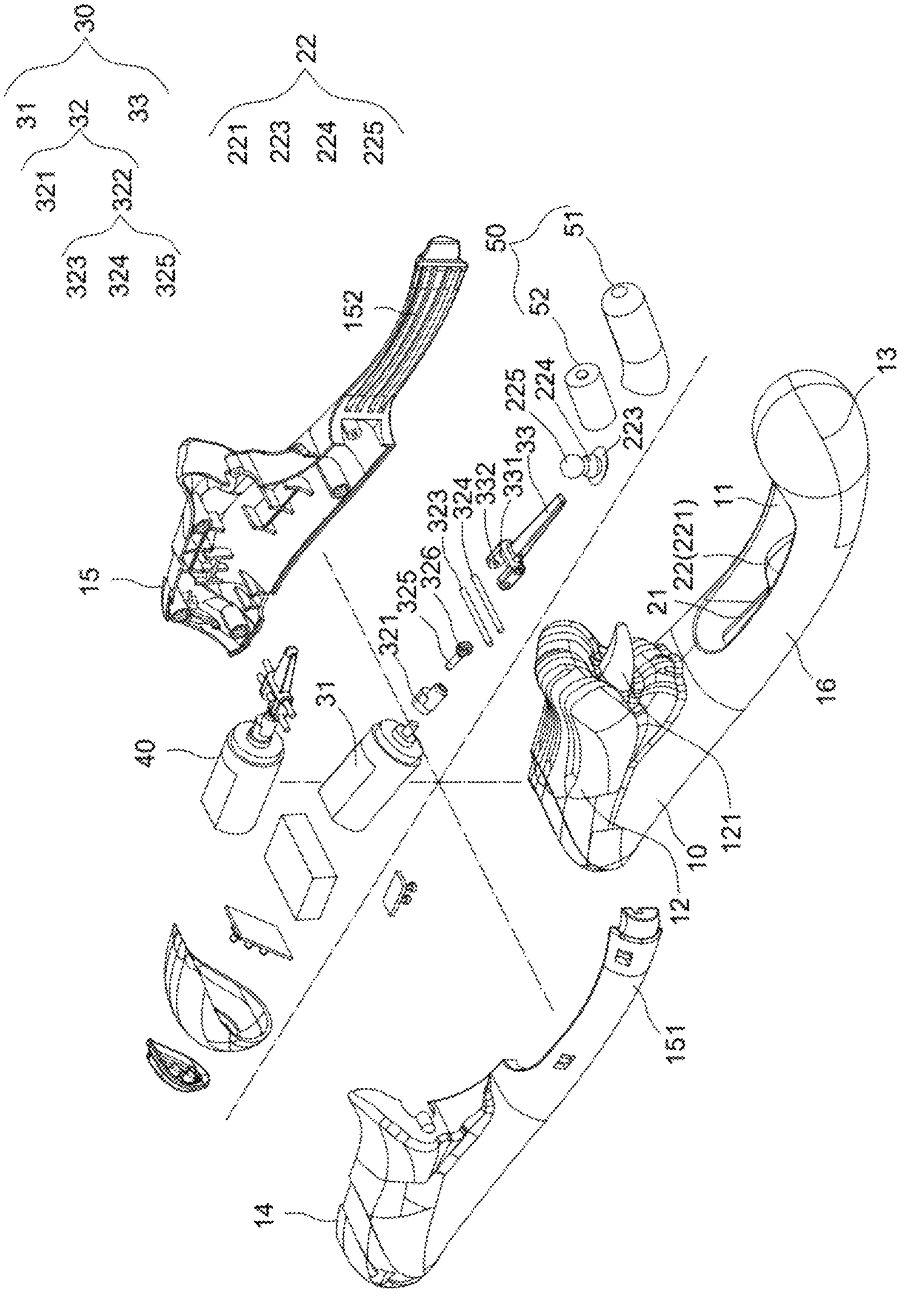
FIG. 1 is an exploded structural view of a massage tool with a patting structure from a first angle according to the present invention.
Figure 2:
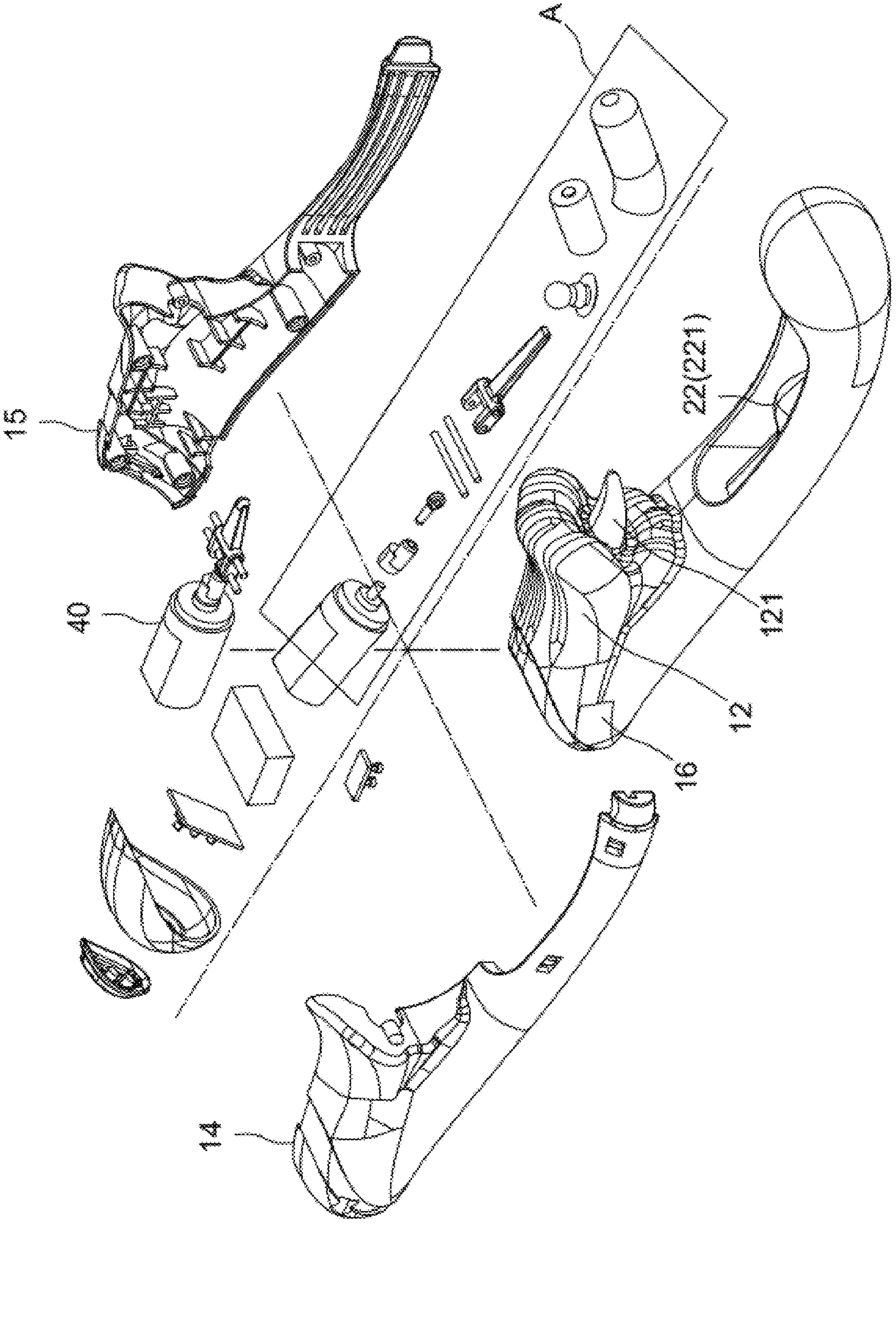
FIG. 2 is an exploded structural view of the massage tool with a patting structure from a second angle according to the present invention.

Description of reference signs in the drawings are as follows: 10, main body; 11, massage groove; 12, stirring portion; 121, stirring sleeve; 13, vibrating end head; 14, first shell; 15, second shell; 151, anti-shock arm; 152, anti-shock strip; 16, body rubber sleeve; 20, patting assembly; 21, patting sleeve tube; 22, patting member; 221, patting rubber sleeve; 222, cavity; 223, patting base; 224, patting platform; 225, patting ball; 23, constraining section; 30, first transmission assembly; 31, driving motor; 32, transmission member; 321, centrifugal shaft; 322, transmission support; 323, first movable rod; 324, second movable rod; 325, transmission shaft; 326, transmission hole; 33, swinging rod; 331, connecting plate; 332, connecting hole; 40, second transmission assembly; 50, vibrating assembly; 51, vibrating sleeve tube; and 52, vibrating member.

DETAILED DESCRIPTION OF THE EMBODIMENTS

The present invention will be further described below with reference to the accompanying drawings and implementations:

It should be noted that based on customer's feedback and market research, the applicant has found that conventional massage tools have at least the following problems: First, current massage tools massage the acupoint of the vaginal organ with only one single function, resulting in a poor experience. Second, most column-shaped massage tools are prone to breaking in the middle during use due to the increased vibration frequency. Third, as most massage tools simulate manual massage methods through high-speed vibration, the internal vibration and transmission structures are likely to become loose during vibration, greatly shortening the service life. In view of these shortcomings, the applicant believes it is necessary to provide a massage tool with a patting structure to resolve the problem that a massage tool cannot massage an acupoint of a vaginal organ in multiple manners.

Referring to FIGS. 1 to 11, the present invention discloses a massage tool with a patting structure. The massage tool includes a main body 10 and a patting assembly 20. The main body 10 is provided with a massage groove 11 penetrating upper and lower end surfaces, and the patting assembly 20 is disposed in the massage groove 11. In this embodiment, the main body 10 is in the shape of a long column, and the massage groove 11 is arranged along the long axis direction of the main body 10. One end of the patting assembly 20 abuts against one short-axis side surface of the massage groove 11, and the other end of the patting assembly 20 abuts against the other short-axis side surface of the massage groove 11. It should be explained that the patting assembly 20 is strip-shaped and arranged along the long axis direction of the main body 10, that is, both ends of the patting assembly 20 are integrally connected to the two side walls of the massage groove 11 respectively in the short-axis direction. It should be noted that the patting assembly 20 is movably disposed in the massage groove 11 along a direction between the upper and lower end surfaces of the main body 10, thereby patting and massaging the skin in contact with the upper and lower end surfaces of the main body 10. Specifically, the massage groove 11 of the main body 10 is positioned close to the acupoint of the vaginal organ, and the structural arrangement of the patting assembly 20 allows the patting assembly 20 to perform patting actions at a specific frequency on the vaginal acupoint, stimulating the acupoint at this organ position, thus alleviating discomfort during the user's menstrual period. Additionally, stimulating the acupoint around the organ can improve blood circulation, which helps to improve the user's health. Therefore, through the structural arrangement of the patting assembly 20 of the present invention, the user's clitoral acupoint can be patted and massaged, adding the pat function to the massage tool used by the user and improving the functional diversity of the massage tool.

In some embodiments, referring to FIGS. 1 to 4 and 6, the patting assembly 20 specifically includes a patting sleeve tube 21 and a patting member 22. One end of the patting member 22 is connected to one end of the patting sleeve tube 21, and the other end of the patting sleeve tube 21 is connected to an inner wall of one side surface of the massage groove 11. The patting sleeve tube 21 is configured to drive the patting member 22 to reciprocate at a high frequency in the direction between the upper and lower end surfaces of the main body 10, thereby patting and massaging the skin acupoint.

Figure 3:
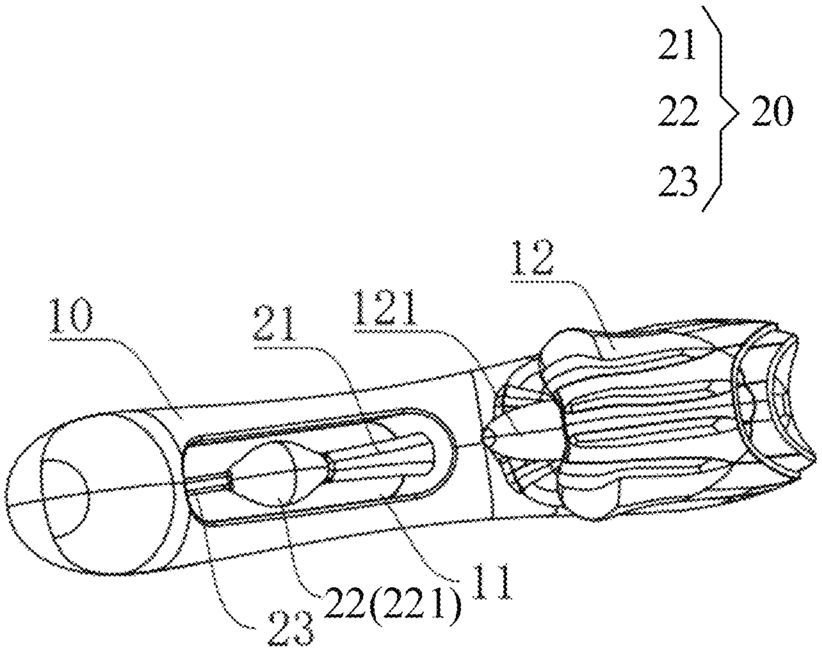
FIG. 3 is a schematic structural diagram of a main body and a patting assembly in the massage tool with a patting structure according to the present invention.
Figure 4:
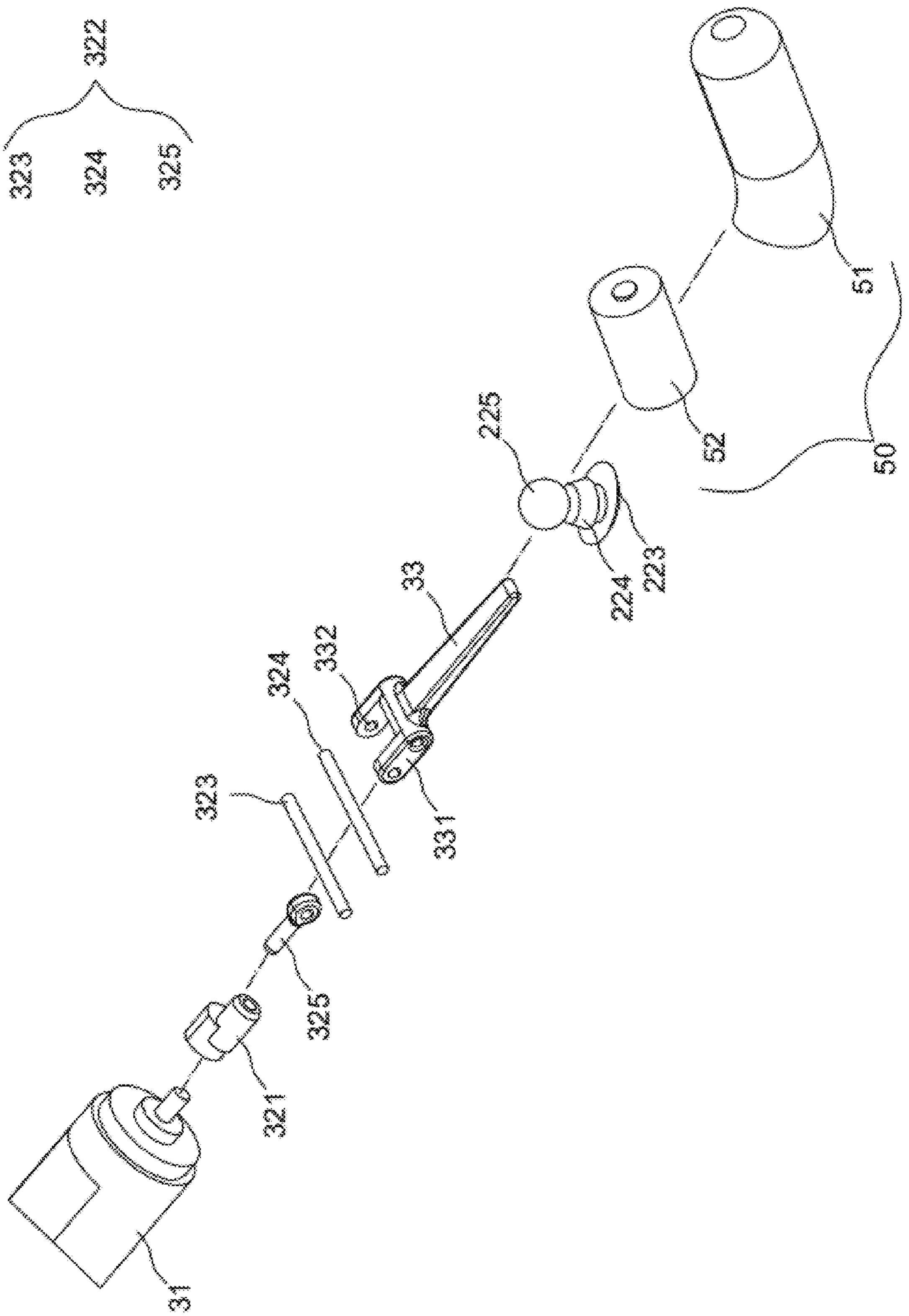
FIG. 4 is a partially enlarged view of portion A of the massage tool with a patting structure in FIG. 2 according to the present invention.
Figure 5:
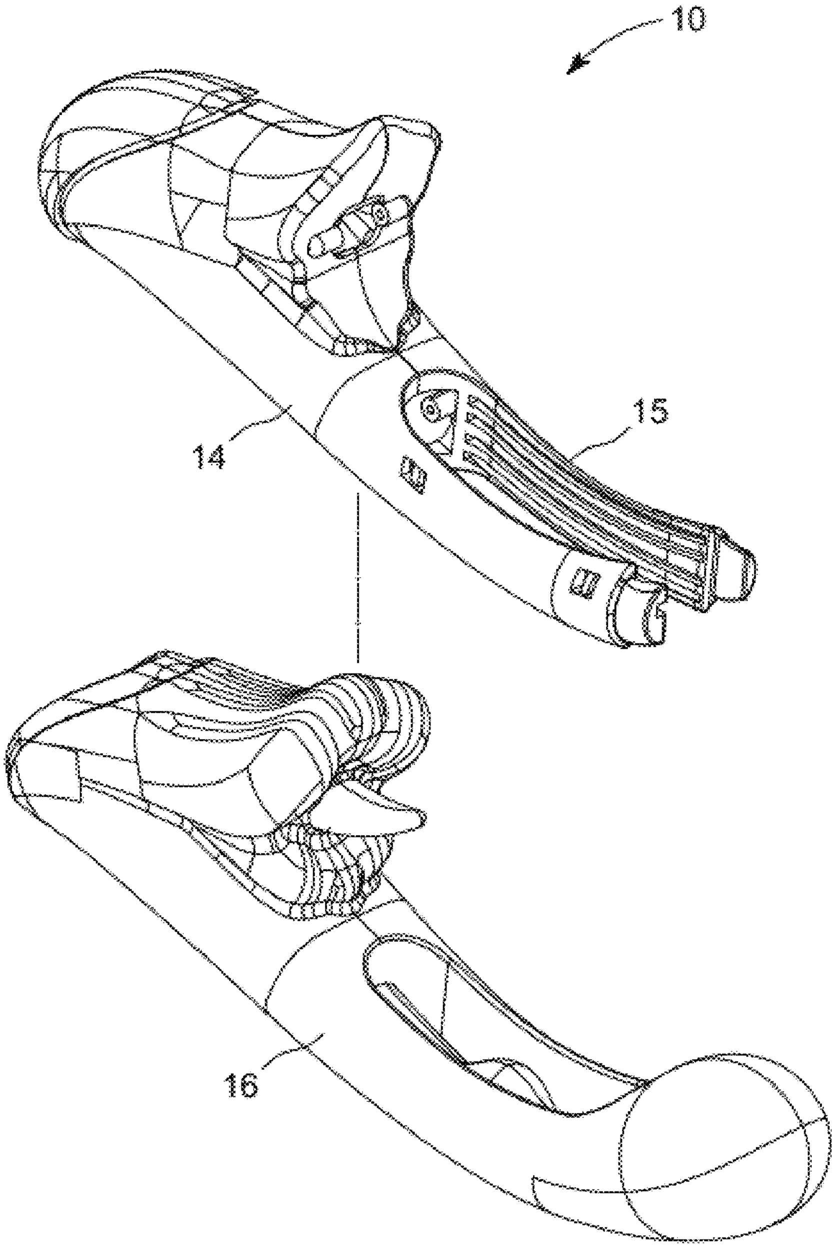
FIGS. 5-11 respectively shows the structures of the main body, the patting assembly, a patting sleeve tube, a first transmission assembly, a transmission member, a transmission support and a second transmission assembly.
Figure 6:
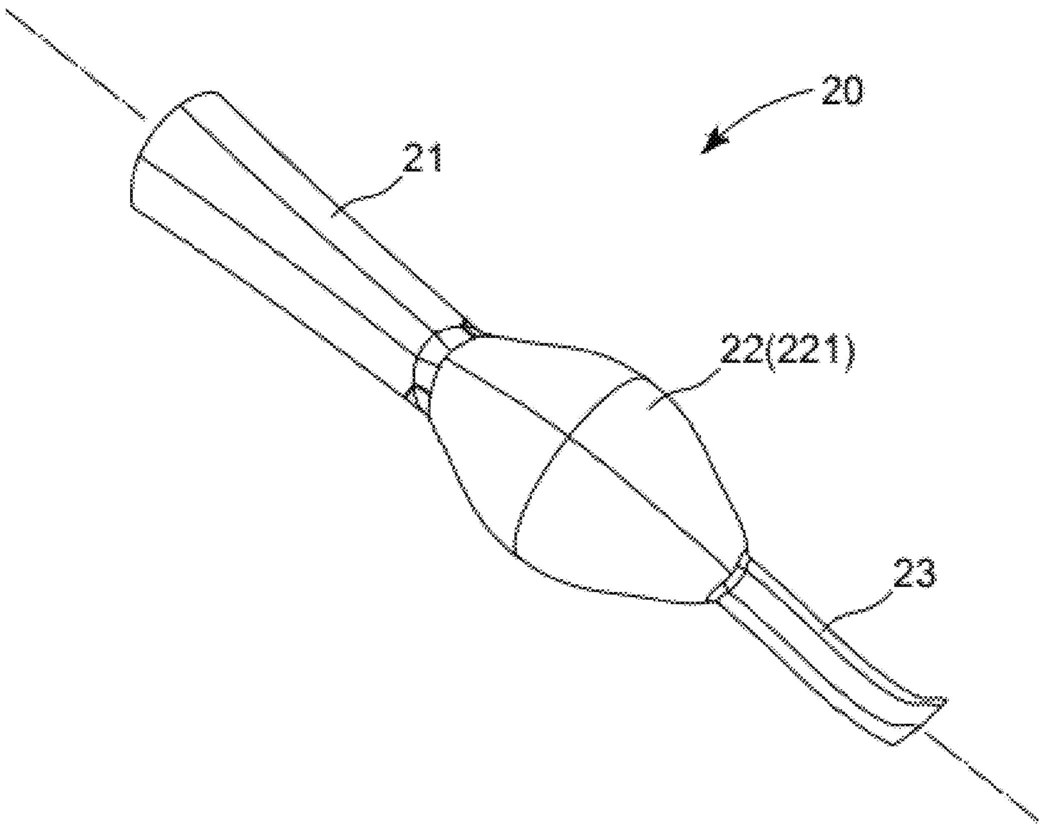
Figure 7:
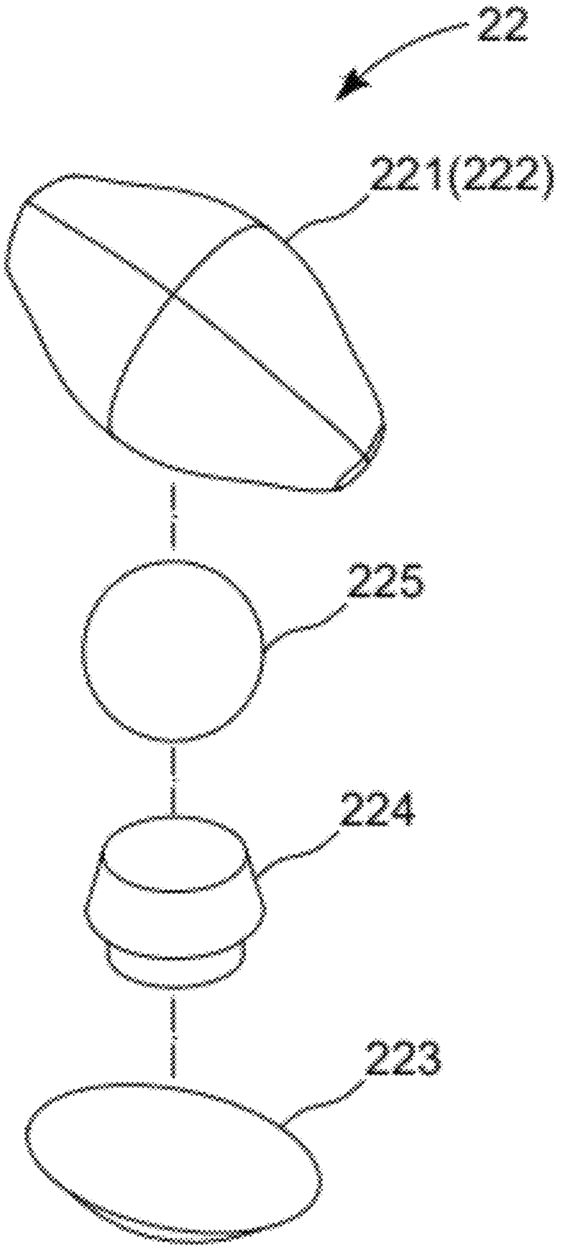
Figure 8:
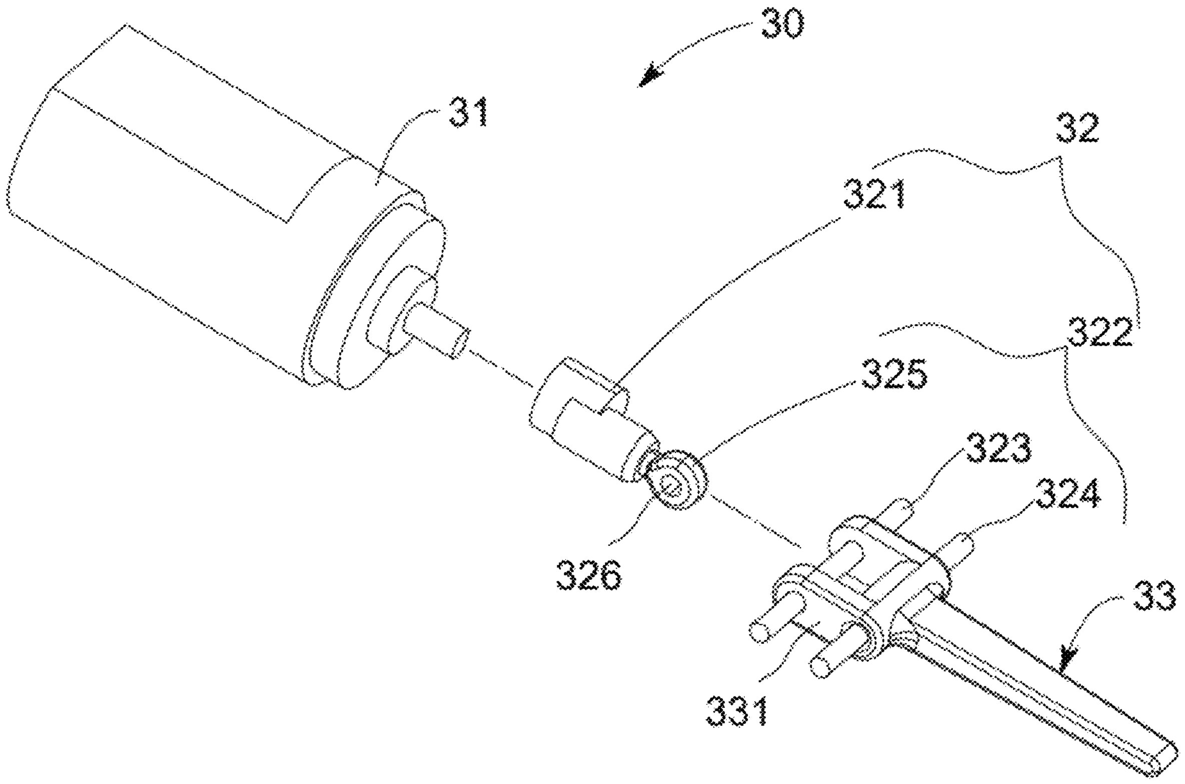
Figure 9:
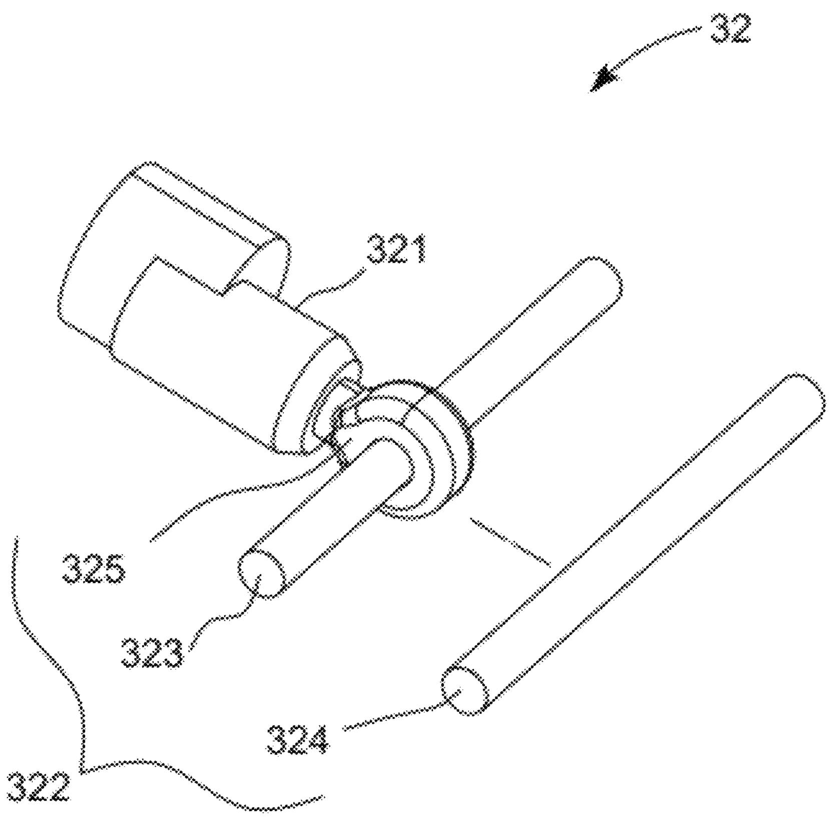
Figure 10:
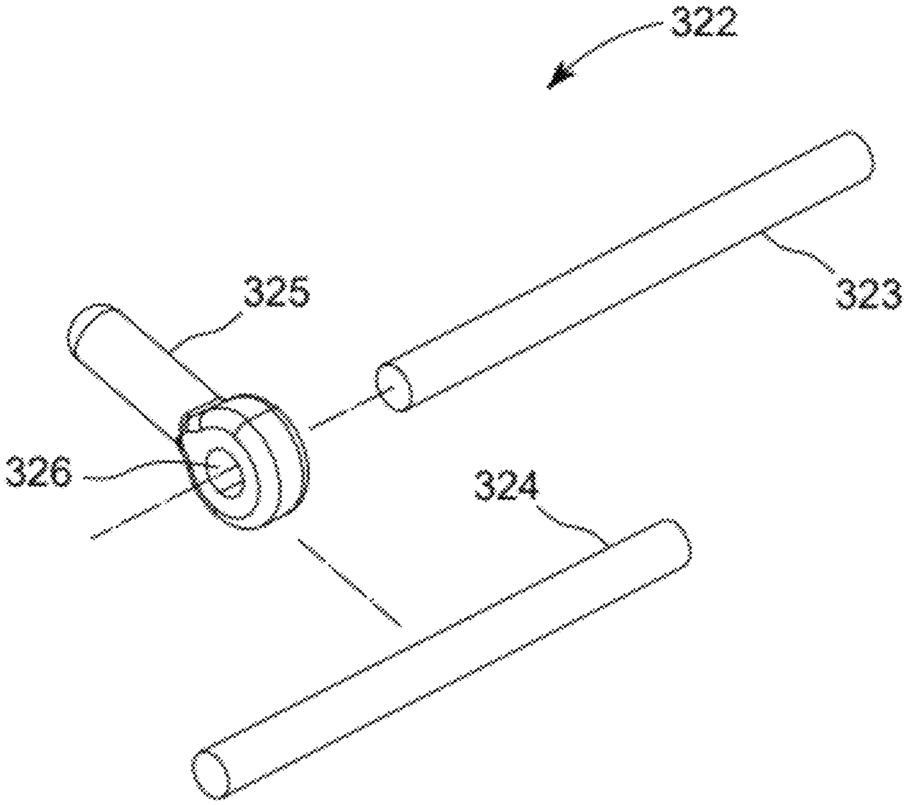
Figure 11:
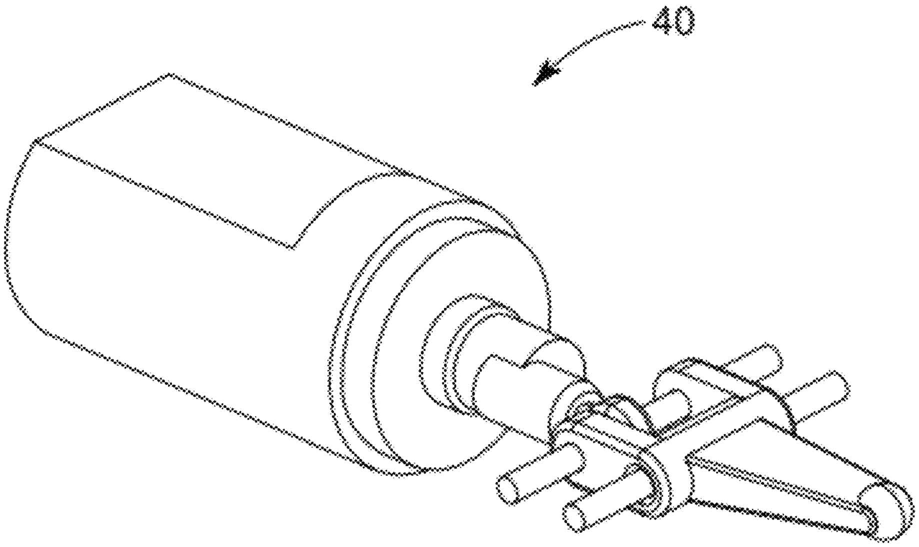

Further, referring to FIGS. 3 and 6, the patting assembly 20 further includes a constraining section 23. One end of the constraining section 23 is connected to the other end of the patting member 22, and the other end of the constraining section 23 is connected to the inner wall of the other side surface of the massage groove 11. During the high-frequency shaking and patting actions of the patting member 22, the constraining section 23 is connected to the other end of the patting member 22 to constrain the amplitude of the patting member 22 during rapid motion, preventing excessive amplitude of the patting member 22 during high-frequency motion, which otherwise causes discomfort from excessive patting force on the user.

Preferably, the constraining section 23 is spiral-shaped and constrains the motion amplitude of the patting member 22 through its inherent spiral proximity property. In this embodiment, the constraining section 23 includes a buffer spring and a buffer sleeve that wraps the buffer spring. The buffer sleeve is configured to isolate the spring from the user's skin, preventing the spring from contacting the skin and causing the user discomfort. It also prevents the spring from rusting due to contact with the bodily fluid during use of the massage tool, thereby prolonging the service life of the spring to some extent. Two ends of the buffer spring are connected to the patting member 22 and the side wall of the massage groove 11, respectively. Specifically, the spring, through its inherent property, constrains the motion amplitude of the patting member 22. It should be supplemented that during production, springs with different elastic coefficients can be matched according to different users' needs for the patting amplitude. The elastic coefficient of the buffer spring is not limited herein.

Further, referring to FIGS. 1 to 4 and 7, the patting member 22 specifically includes a patting rubber sleeve 221. The patting rubber sleeve 221 is provided with a cavity 222, and the bottom of the patting rubber sleeve 221 in the cavity 222 protrudes to form a circular patting base 223. The patting base 223 is provided with a patting platform 224 directed towards the upper end surface of the main body 10, with a patting ball 225 provided in the middle of the patting platform 224. The patting ball 225 is configured to form a force generating point for patting. The patting rubber sleeve 221, the patting base 223, the patting platform 224, and the patting ball 225 are all made of a soft rubber material, and the patting ball 225 has a certain elasticity. This reduces the patting force and improves user's comfort when the patting member 22 pats and massages the acupoint of the vaginal organ.

In some embodiments, referring to FIGS. 1 to 4 and 8, a first transmission assembly 30 is also included. The first transmission assembly 30 is configured to drive the patting rubber sleeve 221 to reciprocate along the direction between the upper and lower end surfaces of the main body 10 in the massage groove 11. The first transmission assembly 30 includes a driving motor 31, a transmission member 32, and a swinging rod 33. The transmission member 32 has one end connected to an output end of the driving motor 31 and the other end connected to the swinging rod 33. Specifically, the patting rubber sleeve 221 is provided with a mounting cavity that matches the swinging rod 33, and the end of the swinging rod 33 away from the transmission member 32 is mounted in the patting rubber sleeve 221. It should be noted that the patting rubber sleeve 221 is made of a soft rubber material, meaning the patting rubber sleeve 221 has elasticity. The driving motor 31 rotates to drive the transmission member 32 to move. The transmission member 32 is in transmissive connection with the swinging rod 33, enabling the swinging rod 33 to reciprocate in the direction between the upper and lower end surfaces of the main body 10, thereby driving the patting rubber sleeve 221 and the patting member 22 to reciprocate.

Further, referring to FIGS. 1 to 4, 8 and 9, the transmission member 32 specifically includes a centrifugal shaft 321 and a transmission support 322 connected to the centrifugal shaft 321. The centrifugal shaft 321 has one end connected to the output end of the driving motor 31 and the other end connected to one end of the transmission support 322. The other end of the transmission support 322 is connected to the swinging rod 33. Specifically, the structural arrangement of the centrifugal shaft 321 allows the transmission support 322 to reciprocate along the direction between the upper and lower end surfaces of the main body 10, thereby driving the swinging rod 33 to reciprocate. This enables the transmission of the patting rubber sleeve 221 and the patting member 22, ultimately driving the patting member 22 to complete the actions of patting and massaging the acupoint of the vaginal organ.

Further, referring to FIGS. 1, 2, 4 and 8 to 10, the transmission support 322 includes a first movable rod 323, a second movable rod 324, and a transmission shaft 325 movably sleeving the first movable rod 323. The transmission shaft 325 has one end fixedly connected to the other end of the centrifugal shaft 321 and the other end provided with a transmission hole 326 to movably sleeve the first movable rod 323. Additionally, the first movable rod 323 and the second movable rod 324 are both movably connected to the swinging rod 33, and the transmission shaft 325 is configured to repeat the bending amplitude of the first movable rod 323, thereby vibrating the swinging rod 33. In this embodiment, the first movable rod 323 and the second movable rod 324 are arranged in parallel, and both ends of the first movable rod 323 and the second movable rod 324 are fixedly connected to the structure of the main body 10. Moreover, the swinging rod 33 is T-shaped, with the lower portion extending into the mounting cavity of the patting rubber sleeve 221, and two ends of the upper portion extending along the long-axis direction to form a connecting plate 331. The connecting plate 331 is provided with two sets of connecting holes 332, and the two sets of connecting holes 332 respectively match the first movable rod 323 and the second movable rod 324. It should be explained that the swinging rod 33 sleeves the first movable rod 323 and the second movable rod 324 via the two sets of connecting holes 332 of the connecting plate 331. Specifically, the first movable rod 323 is elastic, and the second movable rod 324 is not. When the centrifugal shaft 321 drives the transmission shaft 325 to rotate, it can drive the transmission shaft 325 to reciprocate along the axial direction of the first movable rod 323 via the transmission hole 326. The elastic structure of the first movable rod 323 with two ends connected to the main body 10 allows the first movable rod 323 to bend and reciprocate along the direction between the upper and lower end surfaces of the main body 10. This bending motion of the first movable rod 323 drives the swinging rod 33 to reciprocate in the same direction around the second movable rod 324, thereby driving the patting rubber sleeve 221 and the patting member 22 to pat and massage the acupoint of the vaginal organ.

In some embodiments, referring to FIGS. 1 to 3, 5 and 11, the main body 10 is provided with a stirring portion 12, and the stirring portion 12 extends to form a stirring sleeve 121. The stirring sleeve 121 is located above the massage groove 11. Additionally, the massage tool further includes a second transmission assembly 40 disposed in the stirring sleeve 121. The second transmission assembly 40 is configured to drive the stirring sleeve 121 to stir, thereby massaging an acupoint of the clitoral organ. The stirring portion 12 cooperates with the patting assembly 20 which massages the vaginal organ, allowing the massage tool to simultaneously massage acupoints at both the clitoral and vaginal organs, increasing the functional diversity of the present invention and enhancing user's experience.

It should be noted that the structures and working principles of the first transmission assembly 30 and the second transmission assembly 40 are the same. Therefore, the second transmission assembly 40 is not described herein.

Preferably, the stirring portion 12 is also provided with a patting tongue, and the interior of the patting tongue is connected to the second transmission assembly 40. The second transmission assembly 40 drives the patting tongue to stir, thereby simulating patting actions to massage the user.

In some embodiments, referring to FIGS. 1 to 4, the main body 10 extends to form a vibrating end head 13. A vibrating assembly 50 is disposed in the vibrating end head 13. The vibrating assembly 50 is configured to drive the vibrating end head 13 to vibrate, thereby massaging an acupoint in the vaginal organ of the user.

Further, referring to FIGS. 1 to 4, the vibrating assembly 50 includes a vibrating sleeve tube 51 and a vibrating member 52 disposed in the vibrating sleeve tube 51. The vibrating member 52 is configured to drive the vibrating sleeve tube 51 and the vibrating end head 13 to vibrate, thereby massaging an acupoint in the vaginal organ. On the basis that the structural arrangement of the patting assembly 20 and the stirring portion 12 allows the acupoint at the vaginal organ to be patted and massaged and the acupoint at the clitoral organ to be massaged simultaneously in the present invention, the structural arrangement of vibrating assembly 50 allows the acupoint at the vaginal organ to be vibrated and massaged, increasing the massage function diversity of the product and enhancing the user's massage experience.

In some embodiments, referring to FIGS. 1 to 5, the main body 10 includes a first shell 14, a second shell 15 connected to the first shell 14, and a body rubber sleeve 16. The first shell 14 fits with and is connected to the second shell 15 to form the skeleton of the main body 10. The body rubber sleeve 16 sleeves the first shell 14 and the second shell 15 and is configured to isolate the interior of the product from the outside, improving the water resistance and air tightness of the product. Specifically, the first transmission assembly 30 and the second transmission assembly 40 are both mounted in the middle of the two shells. Specifically, the opposite sides of the first shell 14 and the second shell 15 protrude inward to form a clamping structure for mounting the transmission assemblies. The structural arrangement of the clamping structure can increase the structural stability of the transmission assemblies, thereby reducing the possibility of damage to the transmission assemblies and the shells during high-frequency operation of the transmission assemblies, thus prolonging the service life of the product to some extent.

In some embodiments, referring to FIGS. 1 to 5, the first shell 14 and the second shell 15 each extend an anti-shock arm 151 in the direction of the massage groove 11. The two anti-shock arms 151 are located on both sides of the massage groove 11, and the opposite sides of the two anti-shock arms 151 are provided with anti-shock strips 152. The structural arrangement of the anti-shock strips 152 increases the anti-shock coefficient of the anti-shock arms 151, thereby reducing the risk of the two sides of the massage groove 11 breaking during high-frequency vibration.

It should be understood that persons of ordinary skill in the art can make modifications or changes based on the above description, and such modifications and changes should all fall within the protection scope of the claims of the present invention.

The above has provided an exemplary description of the present patent with reference to the drawings. It is evident that the implementation of the present patent is not limited to the above methods. Various modifications made using the method conceptions and technical solutions of the present patent, or direct applications of the conceptions and technical solutions of the present patent to other occasions without modification all fall within the protection scope of the present invention.

What is claimed is:

1. A massage tool with a patting structure, comprising:

a main body, wherein the main body is in a shape of an elongated column and provided with a massage groove, and the massage groove is a rounded oblong groove arranged in a middle portion of the main body along a longitudinal axis direction of the main body, and penetrates through the main body in a radial direction of the main body; and a patting assembly disposed in the massage groove, wherein in the longitudinal axis direction of the main body, an end of the patting assembly is connected to a side surface of the massage groove, and another end of the patting assembly is connected to another side surface of the massage groove; and the patting assembly is movably disposed in the massage groove and movable in a penetrating direction of the massage groove, such that the patting assembly is configured to pat and massage skin, in direct contact with the patting assembly, in the penetrating direction of the massage groove, wherein the patting assembly comprises a patting sleeve tube, a patting member and a constraining section which are sequentially arrange in the longitudinal axis direction of the main body; in the longitudinal axis direction of the main body, an end of the patting sleeve tube is connected to the side surface of the massage groove, another end of the patting sleeve tube is connected to an end of the patting member, another end of the patting member is connected to an end of the constraining section, and another end of the constraining section is connected to the another side surface of the massage groove; and the patting sleeve tube is configured to drive the patting member to pat and massage the skin in the penetrating direction of the massage groove, and the constraining section is configured to constrain a motion amplitude of the patting member, wherein the patting member comprises a patting rubber sleeve, the patting rubber sleeve is provided with a cavity, a patting base is formed at a bottom of the cavity of the patting rubber sleeve, a patting platform is disposed on the patting base, and a patting ball for pat and massage is disposed on the patting platform.

2. The massage tool according to claim 1, further comprising a first transmission assembly configured to drive the patting rubber sleeve to move in the penetrating direction of the massage groove, wherein the first transmission assembly comprises a driving motor, a transmission member and a swinging rod, the driving motor, the transmission member and the swinging rod are sequentially arranged in the longitudinal axis direction of the main body; in the longitudinal axis direction of the main body, an output end of the driving motor is connected to an end of the transmission member, another end of the transmission member is connected to an end of the swinging rod, and another end of the swinging rod is mounted in the patting rubber sleeve; and the transmission member is configured to enable the swinging rod to drive the patting rubber sleeve to move in the massage groove in the penetrating direction of the massage groove.

3. The massage tool according to claim 2, wherein the transmission member comprises a centrifugal shaft and a transmission support connected to the centrifugal shaft; in the longitudinal axis direction of the main body, an end of the centrifugal shaft is connected to the output end of the driving motor, another end of the centrifugal shaft is connected to an end of the transmission support, and another end of the transmission support is connected to the end of the swinging rod; and the centrifugal shaft is configured to drive the transmission support to perform offset motion, so as to drive the swinging rod to move.

4. The massage tool according to claim 3, wherein the transmission support comprises a first movable rod, a second movable rod and a transmission shaft movably sleeving the first movable rod, the transmission shaft is connected to the another end of the centrifugal shaft, the first movable rod and the second movable rod are both movably connected to the swinging rod, and the transmission shaft is configured to repeatedly change a bending amplitude of the first movable rod, so as to shake the swinging rod.

5. The massage tool according to claim 1, wherein the main body is provided with a stirring portion, the stirring portion extends to form a stirring sleeve, and the stirring sleeve is located above the massage groove; and the massage tool further comprises a second transmission assembly in the stirring sleeve, and the second transmission assembly is configured to drive the stirring sleeve to stir for massage.

6. The massage tool according to claim 5, wherein the main body extends upwards to form a vibrating end head, a vibrating assembly is disposed in the vibrating end head, and the vibrating assembly is configured to drive the vibrating end head to vibrate to massage a user.

7. The massage tool according to claim 6, wherein the vibrating assembly comprises a vibrating sleeve tube and a vibrating member disposed in the vibrating sleeve tube, and the vibrating member is configured to drive the vibrating sleeve tube and the vibrating end head to vibrate.

* * * * *